United States Patent [19]

Esola et al.

[11] Patent Number: 5,009,245
[45] Date of Patent: Apr. 23, 1991

[54] PRESSURE REGULATOR

[75] Inventors: John L. Esola, Falls Creek; David L. Kessler, DuBois, both of Pa.

[73] Assignee: M&FC Holding Company, Inc., Wilmington, Del.

[21] Appl. No.: 587,621

[22] Filed: Sep. 20, 1990

Related U.S. Application Data

[63] Continuation of Ser. No. 354,499, May 19, 1989, abandoned.

[51] Int. Cl.$^5$ ............................................. G05D 16/06
[52] U.S. Cl. ................................ 137/116.5; 137/505.47
[58] Field of Search ..................... 137/505.46, 505.47, 137/116.5, 505.11

[56] References Cited

U.S. PATENT DOCUMENTS

| 329,119 | 9/1985 | Ball et al. ........................ 137/505.47 |
| 1,283,502 | 11/1918 | Groble ........................ 137/505.47 X |
| 1,626,581 | 4/1927 | Gaunt et al. .................. 137/505.47 |
| 2,651,328 | 9/1953 | Gamble . | |
| 2,729,236 | 1/1956 | Valince ........................ 137/505.46 |
| 2,942,624 | 6/1960 | Good . | |
| 2,950,739 | 8/1960 | Lofink . | |
| 2,987,074 | 6/1961 | Niesemann .................. 137/505.46 |
| 3,032,054 | 5/1962 | Irwin ......................... 137/505.46 X |
| 3,339,581 | 9/1967 | Courtot ...................... 137/505.47 X |
| 4,069,839 | 1/1978 | Hughes ...................... 137/505.47 X |
| 4,782,850 | 11/1988 | Duffy et al. .................. 137/116.5 |

FOREIGN PATENT DOCUMENTS 691716 5/1953 United Kingdom ........... 137/505.46

Primary Examiner—Stephen M. Hepperle
Attorney, Agent, or Firm—Lorusso & Loud

[57] ABSTRACT

A diaphragm actuated pressure regulator is provided having a molded contoured diaphragm capable of operation in the upper portion of the diaphragm's deflection stroke without experiencing material deformation and thereby preserving the precision of the diaphragm's response to pressure fluctuations. The pressure regulator includes a curved lever arm for transmitting the deflection of the diaphragm to a displacement of a valve pad which regulates the flow of gas from an inlet through an orifice restriction to an outlet. The lever fulcrum is located in the throat area of the pressure regulator and supported by a guide to provide a high lever ratio which enables a relatively small diaphragm to generate a relatively high valve closing force. In a preferred embodiment of the invention the diaphragm includes an O-ring shaped circumference which is secured between the upper assembly and the lower case of the pressure regulator thereby insuring an air tight seal without the need for an additional gasket or sealant material.

11 Claims, 2 Drawing Sheets

PRESSURE REGULATOR

This is a continuation of copending applications Ser. No. 07/354,499 filed on May 19, 1989 now abandoned.

FIELD OF THE INVENTION

The present invention relates to diaphragm actuated pressure regulators and more particularly to diaphragm actuated pressure regulators having a compact construction.

BACKGROUND OF THE INVENTION

Diaphragm actuated pressure regulators generally operate by placing a flexible diaphragm in fluid communication with an area the pressure of which is maintained to be equivalent to the fluid line pressure being regulated. As the pressure in this area fluctuates, the diaphragm deflects proportionally. There is typically provided a counteracting spring force to regulate the diaphragm so that it deflects in a predictable fashion. It is known to control the movement of a valve which regulates the flow of fluid into the fluid line, and consequently into the area abutting the diaphragm, by means of a mechanical linkage connecting the valve to the diaphragm so that the deflection of the diaphragm has a direct impact on the rate of that fluid flow into the area and fluid line thus regulating the fluid pressure.

If the overall size of the regulator were otherwise inconsequential, it would be advantageous to employ as large a diaphragm as possible. This is because a large diaphragm, in conjunction with a small lever ratio, provides the necessary power to position the valve. The small lever ratio reduces the required deflection stroke which enables the regulator to operate with a higher degree of precision than a regulator having a smaller diaphragm with a longer stroke.

Two operating problems arise when a conventional diaphragm having a long stroke is used. The diaphragm area changes and the spring force changes over the range of the diaphragms' deflection stroke. Both of these factors are detrimental to the pressure control of the fluid passing through the regulator.

Another advantage to having a large diaphragm is that less pressure needs to be exerted on the diaphragm to generate a sufficient force on the linkage and valve to lock up the regulator so that all fluid flow to the fluid line is stopped. A typical regulator of this type will have a diaphragm of 26 square inches and a lever ratio of 3:1. Accordingly, when 1 psi. of outlet pressure is exerted on this diaphragm a resulting lock-up force of 78 pounds is generated to close off the valve.

Accordingly, known diaphragm actuated pressure regulators often use a diaphragm which is large enough so that with a typical lever ratio they will afford the desired pressure control. Regulators using these large diaphragms, however, are relatively expensive to manufacture and obtrusive when installed.

Due to the nature of the environments in which pressure actuators of this type are used, it is desirable that they be of as compact construction as possible. This is also desirable for the purpose of reducing material costs. It is generally not advisable, therefore, to use large diaphragms.

Known diaphragm actuated pressure regulators have been able to reduce the size of the diaphragm used by providing diaphragms with changeable surface areas and complicated linkages. By so doing, known regulators have been able to provide a longer deflection stroke with less material deformation than conventional pressure regulators having smaller diaphragms with longer strokes. One such regulator is described in U.S. Pat. No. 2,651,328 to C. B. Gamble.

These known pressure regulators, however, can be complicated to manufacture and operate. In an effort to translate the vertical deflection of the diaphragm to an increased horizontal displacement of the valve, known regulators such as the cited patent have used linear multi-part linkage assemblies. These linkages are difficult to assemble during construction of the regulator and the linkage joints can become loose and impair the precision of the device.

It is therefore an object of the present invention to provide a diaphragm actuated pressure regulator that uses a relatively small diaphragm which can be operated with a long stroke without experiencing material deformation and therefore a lack of precision.

It is another object of the present invention to provide a diaphragm actuated pressure regulator with a relatively small diaphragm and a relatively large lever ratio.

It is yet another object of the present invention to provide a diaphragm actuated pressure regulator that has a more compact construction than known pressure regulators offering the same amount of lock up force.

It is still another object of the present invention to provide a diaphragm actuated pressure regulator that has a simpler construction than known pressure regulators.

SUMMARY OF THE INVENTION

The problems of the prior art are greatly resolved by the device of the present invention which is a diaphragm actuated pressure regulator having a relatively small diaphragm which is capable of increasing its surface area when in the upper portion of its deflection stroke and a lever ratio which is greater than the lever ratio afforded by known pressure regulators. This large lever ratio is achieved by moving a fulcrum pin about which a lever of the regulator rotates into the throat of the regulator.

In accordance with the present invention, the pressure regulator is provided with a one piece curved lever arm and a fulcrum pin positioned in the throat area of the regulator which can provide a lever ratio of as much as twice that of a pressure regulator having a standard straight lever arm and a fulcrum pin positioned in the regulator's lower case. This allows the current pressure regulator to generate a valve closing force that is substantially greater than the valve closing force generated by known pressure regulators. Accordingly, the pressure regulator of the present invention can operate with a much smaller diaphragm. The result of having a greater lever ratio, however, is that the diaphragm will be forced to deflect proportionally farther than a diaphragm being used in an assembly with a standard lever ratio.

To allow the pressure regulator of the present invention to operate properly with a greater lever ratio and consequently greater deflection stroke, there is provided a molded diaphragm having a contoured profile so that there is reduced deformation of the diaphragm material as the upper portion of the diaphragm's deflection stroke is approached. The diaphragm is designed to have an effective surface area against which the pressure in the abutting area acts and contoured portions which behave in a hinging fashion. In this manner, the diaphragm will have a substantially constant effective surface area due to the ability of the contoured portions of the diaphragm to absorb the effects of the diaphragm's deflection. This allows the diaphragm to deflect while experiencing minimal deformation of the diaphragm material itself. As a result, a diaphragm is provided with a useful deflection stroke of up to twice as long as the deflection stroke of a flat diaphragm.

By combining the features of a one piece curved lever arm, a fulcrum pin positioned in the regulator throat area, and a contoured diaphragm, the present invention is able to provide a pressure regulator having a smaller diaphragm case than known pressure regulators while providing the same performance characteristics. Because of this size reduction and simplified construction, the pressure regulator in accordance with the present invention will have a significantly lower material cost than known pressure regulators and operate more precisely.

BRIEF DESCRIPTION OF THE DRAWING

The invention will be more fully understood by reading the following description in conjunction with the figures described below in which like reference numbers refer to like members.

DETAILED DESCRIPTION OF PREFERRED EMBODIMENTS

At the outset, the invention is described in its broadest overall aspects with a more detailed description following. In its broadest aspects the pressure regulator of the present invention is provided with a pressure responsive diaphragm in fluid communication with a fluid line receiving pressurized gas from a source and delivering the gas for use. The diaphragm provided is designed to have a relatively constant effective surface area so that operation in the upper portion of the diaphragm's deflection stroke can be utilized. Additionally, the pressure regulator of the present invention includes a curved lever arm for transmitting the deflection of the diaphragm to a valve pad to restrict the amount of gas that can flow from the source line to the delivery line.

Figure 1:
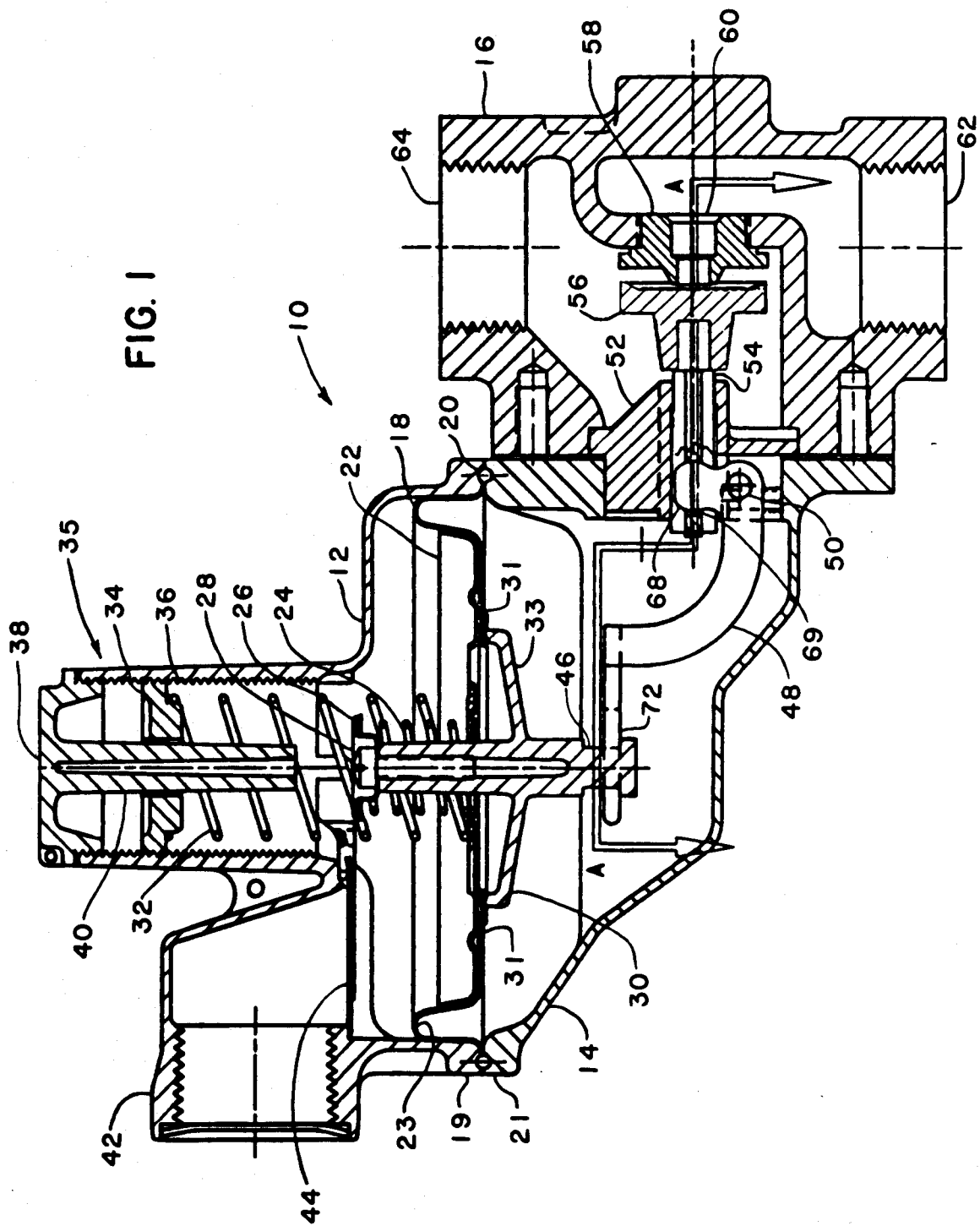
FIG. 1 is a cross sectional view of a diaphragm actuated pressure regulator in accordance with the present invention.

In FIG. 1 there is shown a pressure regulator which will be generally referred to by reference number 10. The outer dimensions of the regulator 10 are defined by a cover assembly 12 and a lower case 14 which are secured together and within which the diaphragm assembly of the regulator 10 is contained. The cover assembly 12 and the lower case 14 are formed with equivalent circumferential portions 19 and 21 respectively so that the two components can be affixed together to define an inner chamber of the regulator.

Secured between the mating circumferential portions 19 and 21 is the circumference of a diaphragm 18. In a preferred embodiment of the invention, the diaphragm circumference is molded to form an O-ring 20 which fits within a groove defined by the circumferential portions 19 and 21. In this manner, the pressure regulator of the present invention is constructed more simply than known pressure regulators which require a separate gasket or sealant material to be applied at the junction of the upper and lower portions of the regulator. The present invention, on the other hand provides a one piece diaphragm 18 which is self sealing by means of the O-ring 20 being sandwiched between the circumferential portion 19 of the cover assembly and the circumferential portion 21 of the lower case 14.

Due to its flexibility, the diaphragm 18 will deflect in reaction to pressure changes in the air-tight area below it. A diaphragm pan 22 forms the diaphragm 18 to define an effective surface area against which pressure forces in the area below the diaphragm 18 will act. These pressure forces will tend to urge the diaphragm 18 to deflect upward. Urging the diaphragm 18 in opposition to these pressure forces is a main spring 32 which is buttressed against an adjusting ferrule 34. By selecting the proper spring force for the main spring 32 and positioning the adjusting ferrule 34 the deflection of the diaphragm 18 in relation to the pressure forces in the below area can be controlled.

As just mentioned, in accordance with the present invention the position of the adjusting ferrule 34 is adjustable. As shown in FIG. 1, the adjusting ferrule 34 is positioned within a cylindrical portion 35 of the cover assembly 14 the interior walls 36 of which are threaded. The adjusting ferrule 34, therefore, is reciprocally threaded so that it can be positioned anywhere along the length of the cylindrical portion 35. In this manner, the force exerted by the main spring 32 can be altered by altering the range within which the main spring 32 is forced to retract.

The diaphragm 18 is also provided with a circumferential corrugation 23 about its outer perimeter within the cover assembly 14. This corrugation 23 allows the diaphragm 18 t deflect toward the adjusting ferrule 34 without having to undergo material deformation which would result in an increased opposition to deflection as the diaphragm 18 approached the upper region of its deflection stroke. In this manner, the effective surface area of the diaphragm 18 against which the pressure forces in the lower area will act will remain substantially constant throughout the entire deflection stroke of the diaphragm 18. This allows the pressure regulator of the present invention to be constructed with a much smaller diaphragm than those used in known regulators using flat diaphragms. This is because due to material deformation experienced with flat diaphragms, pressure regulators using these diaphragms can only operate accurately while exploiting half of the diaphragm's available deflection stroke.

In accordance with the present invention, projecting through the center of the diaphragm pan 22 is a diaphragm coupling 30 which serves at least two functions. First, the diaphragm coupling 30 acts as a relief valve when the pressure in the area below the diaphragm 18 exceeds a predetermined level. Second, the diaphragm coupling 30 acts as a means by which the deflection of the diaphragm 18 is transmitted to a lever arm 48 and ultimately to a valve pad 56 which restricts the flow of gas through the regulator.

The diaphragm coupling 30 acts as a relief valve in conjunction with a cover cap 38, a coupling stop 40, a relief spring 24, a spring retainer 26, a retainer screw 28, and the diaphragm pan 22. By compressing the relief spring 24 between the spring retainer 28 and the diaphragm pan 22, the diaphragm coupling 30 is urged upward. The diaphragm coupling 30 is provided however, with a lower apron 33 which forms a seal 31 against the diaphragm 18 and prevents the relief spring 24 from pulling the diaphragm coupling 30 through the diaphragm pan 22. The seal 31 also prevent gas from escaping from the area below the diaphragm 18 during normal operation.

As pressure increases in this lower area, however, the diaphragm 18 will deflect to a greater extent until eventually the retainer screw 28 comes into contact with the coupling stop 40. As the diaphragm 22 deflects past this point, the relief spring 24 will be further compressed between the diaphragm pan 22 and the relief spring retainer 26 and the lower apron 33 of the diaphragm coupling 30 will become separated from the diaphragm 18. As a result, the seal 31 will be broken and gas will be allowed to pass from the area below the diaphragm 18 through the diaphragm 18 and the diaphragm pan 22. The increased gas pressure above the diaphragm 18 will urge a relief valve open and the gas will be able to flow through relief vent 42. This feature of the present invention prevents an unsafe level of pressure from building up below the diaphragm 18 which could result in an explosion.

Figure 2:
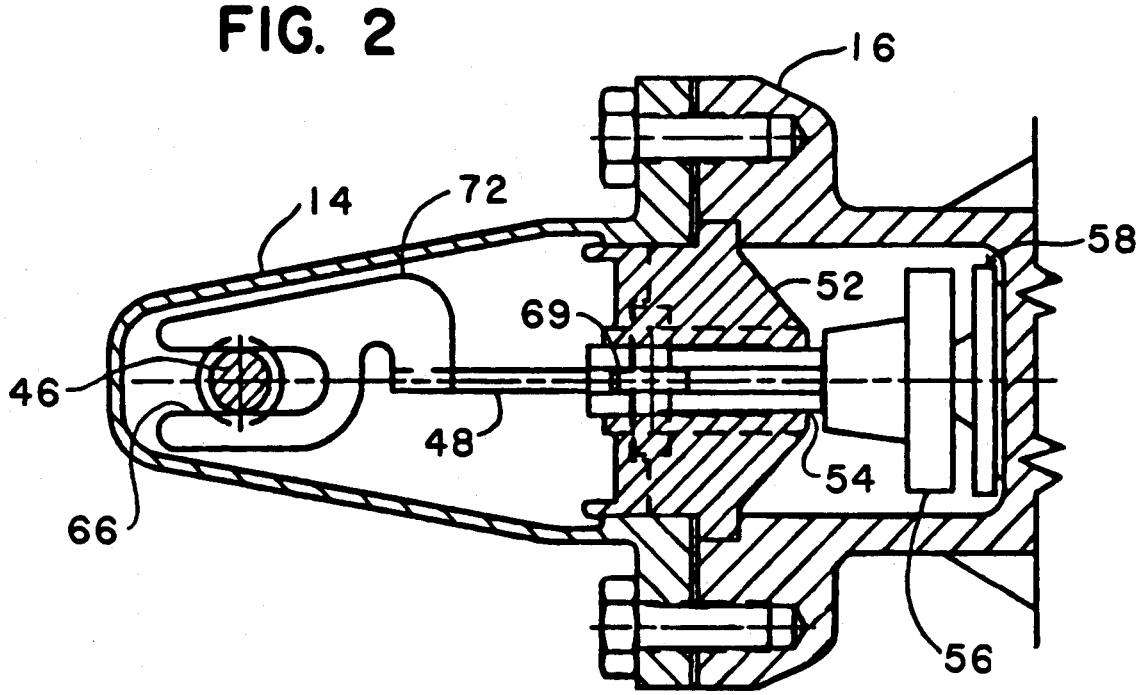
FIG. 2 is a view taken along line A—A of FIG. 1.

On the lower portion of the diaphragm coupling 30 there is provided a coupling neck 46. As shown in FIG. 2, the coupling neck 46 interfits a slot 66 defined by an upper portion 72 of the lever arm 48. Accordingly, as pressure in the area below the diaphragm 18 forces the diaphragm 18 to deflect upward, the diaphragm coupling 30 will prompt the lever arm to pivot about a rocker pin 50. By providing a slotted connection between the diaphragm coupling 30 and the lever arm 48 the linear motion of the diaphragm coupling 30 is simply translated to a rotating motion of the one piece lever arm 48. Known pressure regulators which provide only a pin connection at this point require a complicated linkage assembly to translate the deflection of the diaphragm to a displacement of the valve pad 56. This slot connection also provides for an apparatus that is much more easily assembled than known pressure regulators having pin connections and complicated linkage assemblies.

An important inventive feature of the present pressure regulator is the curved (partial annulus portion) lever arm 48 and the positioning of the fulcrum pin 50 in the throat area of the regulator. The fulcrum pin 50 is supported in the throat area by a stem guide 52. By providing such a curved lever and fulcrum pin arrangement, the pressure regulator 10 has much higher lever ratios than known pressure regulators having straight levers and fulcrum pins located in the regulators' lower cases.

Lever ratio is determined as a function of the horizontal distance between the fulcrum pin 50 and the center of the diaphragm 18 as compared to the vertical distance between the fulcrum pin 50 and the stem 54. Clearly then, the greater the horizontal distance between the fulcrum pin 50 and the center of the diaphragm 18, for a constant vertical distance between the fulcrum pin 50 and the stem 54, the greater the lever ratio will be. It is therefore an important feature of the present invention that the fulcrum pin 50 is located in the throat area of the regulator rather than being more centrally located within the lower case as is done in conventional regulators. This construction is further facilitated by the use of the curved moment arm 48. In this manner, the horizontal distance between the fulcrum pin 50 and the center of the diaphragm 18, and thereby the lever ratio, is maximized.

In a preferred embodiment of the present invention the lever arm and fulcrum pin arrangement provides a lever ratio of 6:1 as opposed to known pressure regulators which traditionally have lever ratios in the neighborhood of 3:1. This increased lever ratio allows the diaphragm 18 to generate a higher valve closing force than it could generate if a small lever ratio were used. Accordingly, the pressure regulator 10 of the present invention can be constructed with a diaphragm that is much smaller than would be necessary if a small lever ratio were used. While this increased lever ratio results in the diaphragm 18 having an increased deflection stroke, as discussed above, the diaphragm 18 of the present invention having the corrugation 23 enables it to operate effectively over a broader deflection range than known flat diaphragms. In this manner, the curved lever arm 48, the positioning of the fulcrum pin 50, and the molded diaphragm 18 of the present invention cooperate to provide a pressure regulator that is much more compact than known pressure regulators.

Forming part of the lever arm 48 is a stem drive 68 which fits in a slot 69 of a stem 54. The stem 54 is capable of linear movement and is supported by a stem guide 52. Attached to a distal end of the stem 54 is a valve pad 56 which is able to regulate the flow of gas passing through an inlet 60 in an orifice restriction 58 by moving toward and away from the orifice restriction 58. The farther away from the orifice restriction 58 that the valve pad 54 is positioned, the greater volume of gas that will be able to flow through the inlet 60. In this manner, the valve pad regulates the flow of gas from a gas inlet port 62 to a gas outlet port 64 and thereby the pressure in the gas outlet port 64.

As gas flows through the inlet 60 in the orifice restriction 58 at a rate greater than that at which it flows out of the gas outlet port 64, the pressure in the area below the diaphragm 18 will rise thereby causing the diaphragm 18, and the diaphragm coupling 30, to deflect in opposition to the spring force generated by the main spring 32. As previously mentioned, this deflection will induce the lever arm 48 to rotate about the rocker pin 50 in a clockwise direction. This rotation of the lever arm 48 will occasion the stem drive 68, positioned within the slot 69, to actuate the stem 54 toward the orifice restriction 58. As a result, the valve pad 56 will also be urged toward the orifice restriction 58 and the flow rate of gas through the orifice restriction inlet 69 will be limited. In this manner, the pressure of the gas flowing out of the gas outlet port 64, which will be equivalent to the gas pressure in the area below the diaphragm 18, will be prevented from exceeding a predetermined level based on the magnitude of the main spring 32 and the positioning of the adjusting ferrule 34.

As the flow of gas through the gas outlet port 64 increases due to increased gas consumption, such as would be engendered by the ignition of a gas powered water heater for example, the pressure in the area below the diaphragm 18 will naturally drop. This pressure drop will result in the diaphragm 18 and the diaphragm coupling 30 having a decreased deflection which will cause the lever arm to rotate about the rocker pin 50 in a counter-clockwise direction. This rotation of the lever arm 48 will occasion the stem drive 68 to actuate the stem 54, and thereby the valve pad 54, away from the orifice restriction 58. By so doing, the pressure regulator 10 will allow a higher rate of gas flow through the inlet 60 of the orifice restriction 58 to balance the flow of gas through the gas outlet port.

An important feature of pressure regulators of this type is their ability to "lock-up" when there is no demand for gas flow out of the regulator. Experience has shown that a pressure regulator needs to generate a 75 pound valve closing force at 1 p.s.i. of gas outlet pressure to provide sufficient lock-up. An example of a known type of pressure regulator having a lever ratio of 3:1 will need a diaphragm having a surface area of 26 in$^2$ to achieve an acceptable lock-up force at this level of operation. A preferred embodiment of the the pressure regulator of the present invention, on the other hand, has a lever ratio of 6:1. Such a lever ratio will enable the pressure regulator 10 to provide comparable performance to known pressure regulators having larger diaphragms while using a diaphragm only having a surface area of from 10 in$^2$ to 14$^2$.

Accordingly, by way of example but not of limitation, with a diaphragm having an effective surface area of only 12.5 in$^2$, the pressure regulator can provide a valve closing force of 75 pounds at 1 p.s.i. of gas outlet pressure. As a result, the pressure regulator of the present invention is a great improvement over known pressure regulators in that it provides a device having a compact construction while providing comparable performance characteristics to known pressure regulators with relatively large diaphragms.

It is another important feature of the pressure regulator of the present invention that the lever arm 48 is a single piece rather than a complicated linkage assembly as has been employed by known pressure regulators trying to provide an increased lever ratio. By providing a curved lever arm 48 and slotted connections 66 and 69, the present invention is able to avoid the drawbacks experienced by known pressure regulators using complicated linkages involving a series of straight lever arms connected by pins. These drawbacks include difficulties in manufacturing due to a higher number of components and less precise operation do to the tendency of pin connections to loosen and develop "play."

Figure 3:
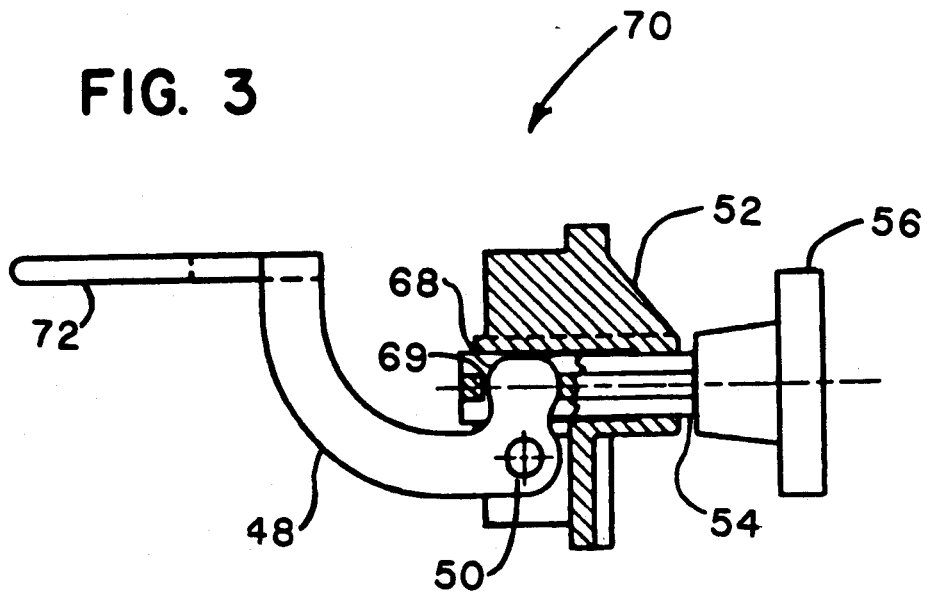
FIG. 3 is a side view in partial cross section of the modular throat assembly of the present invention.

Additionally, the lever arm 48 forms part of the modular throat assembly of the present invention that is generally referred to by reference number 70 in FIG. 3. This modular throat assembly, made up of the curved lever arm 48, the rocker pin 50, the stem guide 52, the stem 54, and the valve pad 56 can be assembled apart from the rest of the regulator and easily installed into the lower case in one simple step where it will be held in place by the body 16. The slotted connection 66 will easily attach to the coupling neck 46 with little to no need for extensive manipulation during assembly of the pressure regulator 10. Accordingly, the modular throat assembly 70 further simplifies the manufacturing process of the pressure regulator 10.

It should be understood that the above description pertains to but one of several embodiments which make use of the present invention. Accordingly, an individual ordinarily skilled in the art will realize additional applications for the present invention. The invention is to be defined, therefore, not by the preceding description but by the claims that follow.

What is claimed is:

1. A pressure regulator for connection to a body having a gas inlet and a gas outlet, the gas inlet being in fluid communication with the gas outlet through an orifice restriction, said pressure regulator comprising:

a substantially concave lower case defining a throat area of the pressure regulator;

a cover assembly secured to the lower case to define an inner chamber;

a contoured, flexible diaphragm secured between the lower case and the cover assembly to separate the inner chamber into upper and lower sections, said lower section being in fluid communication with the orifice restriction through said throat area, said diaphragm being capable of deflecting into the upper section in proportion to the gas pressure in the lower section, and said diaphragm having an outer circumferential corrugation capable of deforming when said diaphragm deflects so that said diaphragm will not experience material deformation during deflection;

means for controlling the deflection of the diaphragm so that the deflection is predictable in relation to the gas pressure in said lower section;

a one piece, curved lever arm in mechanical communication with said diaphragm, said lever arm comprising an upper portion slidably connected to a coupling member fixed to said diaphragm, said upper portion being movable with said coupling member, a first portion of said lever arm extending from said upper portion of said lever arm and substantially normal thereto, a second portion of said lever arm disposed substantially normal to said first portion, said first and second portions being interconnected by a partial annulus portion of said lever arm, and a stem drive portion of said lever arm extending from an end of said lever arm remote from said coupling member and being substantially normal to said second portion and substantially normal to said upper portion;

a fulcrum pin positioned in the throat area of the pressure regulator at the junction of said lever arm second portion and said stem drive portion, said lever being adapted to rotate about said fulcrum pin so that linear deflection of the diaphragm results in rotational displacement of the lever arm, said lever arm and fulcrum pin arrangement providing a lever ratio greater than 3:1; and a throat assembly comprising a stem member connected to said stem drive portion of said lever arm, a stem guide disposed in a wall of said lower case in said throat area, said fulcrum pin being mounted in said stem guide, said stem member being slidably disposed in said stem guide, a distal end of said stem drive portion being disposed in said stem member and a valve pad fixed to said stem member and movable therewith, whereby said valve pad is in mechanical communication with said lever arm so that increased pressure in the lower section, causing the diaphragm to deflect away from said lower section, causes rotational displacement of the lever arm which linearly displaces the valve pad toward said orifice restriction to restrict the flow of gas from the gas inlet to the gas outlet.

2. The pressure regulator as set forth in claim 1 wherein said means for controlling the deflection of the diaphragm includes a main spring and an adjustable ferrule, said main spring being buttressed by said ferrule to exert a force on said diaphragm in opposition to the pressure forces in the lower section.

3. The pressure regulator as set forth in claim 1 wherein said molded diaphragm includes an O-ring portion along its entire circumference which is secured between the lower case and the upper assembly to provide an air tight seal between the lower case and the upper assembly.

4. The pressure regulator as set forth in claim 1 wherein said molded diaphragm has a surface area between 10 in$^2$ and 14 in$^2$.

5. The pressure regulator as set forth in claim 1 wherein said molded diaphragm has a surface area of 12.5 in$^2$.

6. The pressure regulator as set forth in claim 1 further comprising a diaphragm pan adjacent to the surface of said diaphragm facing said upper section, said diaphragm pan forming said diaphragm to define an effective surface area.

7. The pressure regulator as set forth in claim 6 further comprising a diaphragm coupling passing through said diaphragm and said diaphragm pan, said one piece, curved lever arm being connected to a lower end of said diaphragm coupling by means of a slot defined by said lever arm.

8. The pressure regulator as set forth in claim 6 wherein said diaphragm coupling includes a lower apron which abuts the surface of the diaphragm facing said lower section to form an air tight seal so that gas cannot flow from said lower section to said upper section.

9. The pressure regulator as set forth in claim 8 wherein a relief spring is provided between said diaphragm pan and a relief spring retainer secured to a top end of said diaphragm coupling, said relief spring urging said lower apron against said diaphragm, there being further provided a coupling stop positioned a distance directly above said diaphragm coupling so that when said diaphragm deflects greater than said distance said diaphragm coupling will contact said coupling stop thereby compressing said relief spring and breaking the air tight seal between the lower apron and the diaphragm to allow gas to pass from said lower section to said upper section, said upper section being provided with a relief valve for the venting of such gas.

10. The pressure regulator as set forth in claim 1 wherein said one piece, curved lever arm, said stem guide, said stem, said fulcrum pin, and said valve pad can be assembled as a modular unit and inserted into the throat area of said lower case.

11. The pressure regulator as set forth in claim 1 wherein the lever ratio is 6:1.

* * * * *